INVENTOR
B. R. SALTZBERG
BY J. P. Kearns
ATTORNEY

TIMING RECOVERY CIRCUIT USING TIME DERIVATIVE OF DATA SIGNALS

Filed Oct. 6, 1966

United States Patent Office 3,440,548

Patented Apr. 22, 1969

3,440,548

TIMING RECOVERY CIRCUIT USING TIME DERIVATIVE OF DATA SIGNALS

Burton R. Saltzberg, Middletown, N.J., assignor to Bell Telephone Laboratories, Incorporated, Murray Hill, N.J., a corporation of New York Filed Oct. 6, 1966, Ser. No. 584,893
Int. Cl. H03k 5/18
U.S. Cl. 328—151 8 Claims This invention relates to the recovery of timing and sampling information in synchronous data transmission systems.

Figure 1:
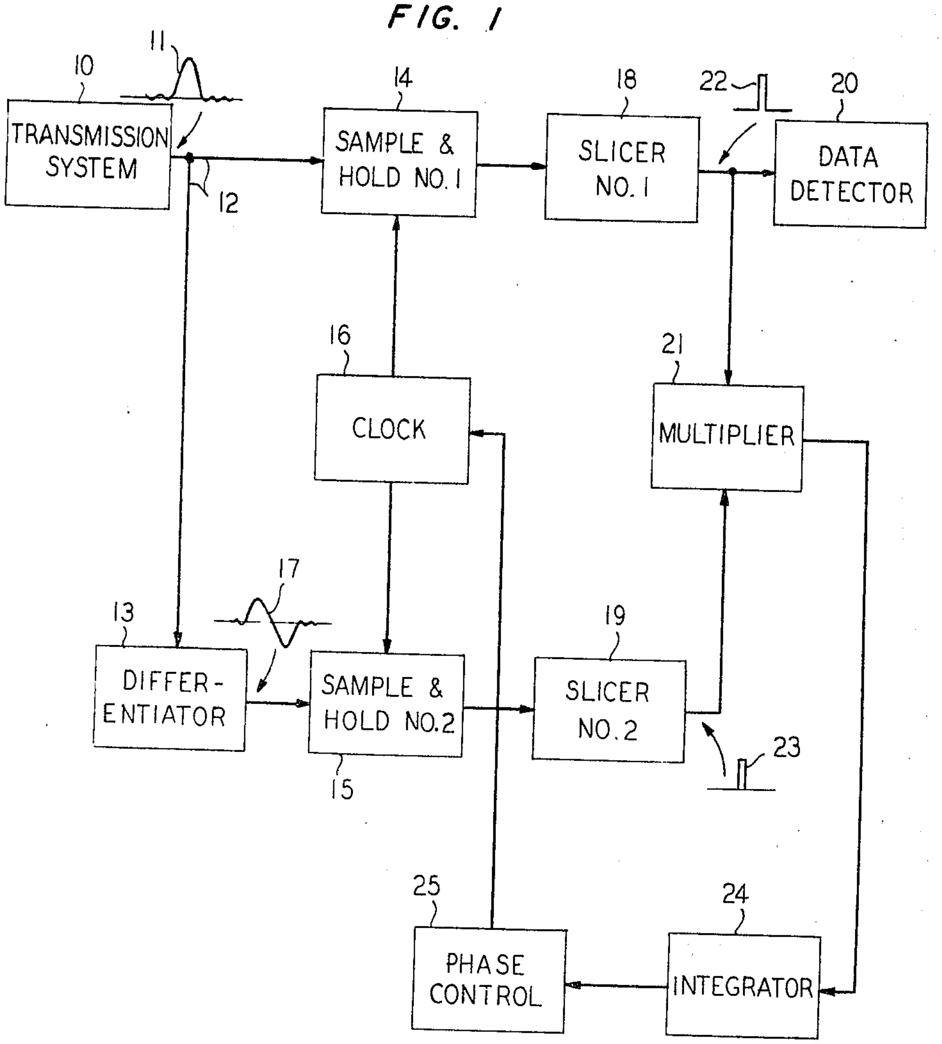

In most synchronous digital data transmission systems, the received baseband signal is properly filtered and then sampled once during each signal interval. The results obtained by such sampling determine the character of the output data. Overall error performance of the data transmission system depends critically on the choice of sampling instant, particularly when multilevel signaling and relatively sharp filtering are employed.

The sampling frequency to be used in a data receiver can be obtained either from the data signal itself or from some auxiliary signal. Whatever the source of the sampling frequency, final phase control is best obtained from the data signal itself which has been subjected to phase distortions in the transmission medium.

Existing sampling systems generally slice the received data signal about one or more thresholds depending on the number of levels transmitted and find the median of the threshold crossing times. The sampling instant is then chosen at a time displaced by one-half a signal interval from the median transition times. If the resulting eye pattern (obtained by a superposition of successive signal intervals on an oscilloscope) is asymmetric, as will be the case where phase distortion is imparted by the transmission medium, this choice of sampling instant is not optimum. The sampling instant chosen on the basis of the average time between transitions does not necessarily coincide with either the peak of the received data signal or the maximum eye pattern aperture.

It is an object of this invention to select the sampling instant for the detection of synchronous digital data at the time of maximum signal response, rather than at an average time between data transitions.

It is a further object of this invention to relate the sampling instant for received synchronous digital data signals to the time of maximum eye pattern opening.

It is another object of this invention to compensate for phase distortion in a transmission medium for digital data signals by varying the choice of sampling instant accordingly.

In accordance with this invention the choice of sampling instant in a timing recovery system for a synchronous digital data receiver is based on the use of the time derivative of the received data signal rather than its threshold crossings.

In one illustrative embodiment adapted to the recovery of a timing wave in a conventional binary data transmission system the baseband received data signal itself and its time derivative as well are sampled under the control of a local clock pulse generator. Both samples are then sliced about a zero threshold level and producted together. Successive products are integrated to form an error signal proportional to the deviation of the sampling instant from the peak of the received data signal. This error signal is finally used in a control loop to adjust the phase of the clock generator accordingly.

In a further illustrative embodiment account is taken of the intersymbol interference of adjacent data signals in order to control the phase of the local clock generator according to the maximum opening of the eye pattern.

In this embodiment polarities of adjacent successive signal samples are stored and first correlated with an analog sample of the present signal. The signal is also differentiated and sampled as in the first embodiment. The sample of the differentiated present signal is then correlated directly with the present signal polarity and with the correlated polarities of adjacent signals. A summation and integration of the last-mentioned correlated signals yields an error signal proportional to derivative of the opening of the eye pattern. Adjustment of the local clock generator in accordance with this error signal results in a sampling wave coincident with the maximum opening of the eye pattern.

A feature of this invention is the complete digitalization of the improved timing recovery circuit. For the first embodiment the implementation is no more complex than for the less accurate threshold crossing circuits.

A particular advantage of the timing recovery system of this invention is the minimization of sampling error in the presence of noise for the most adverse message sequence.

Figure 2:
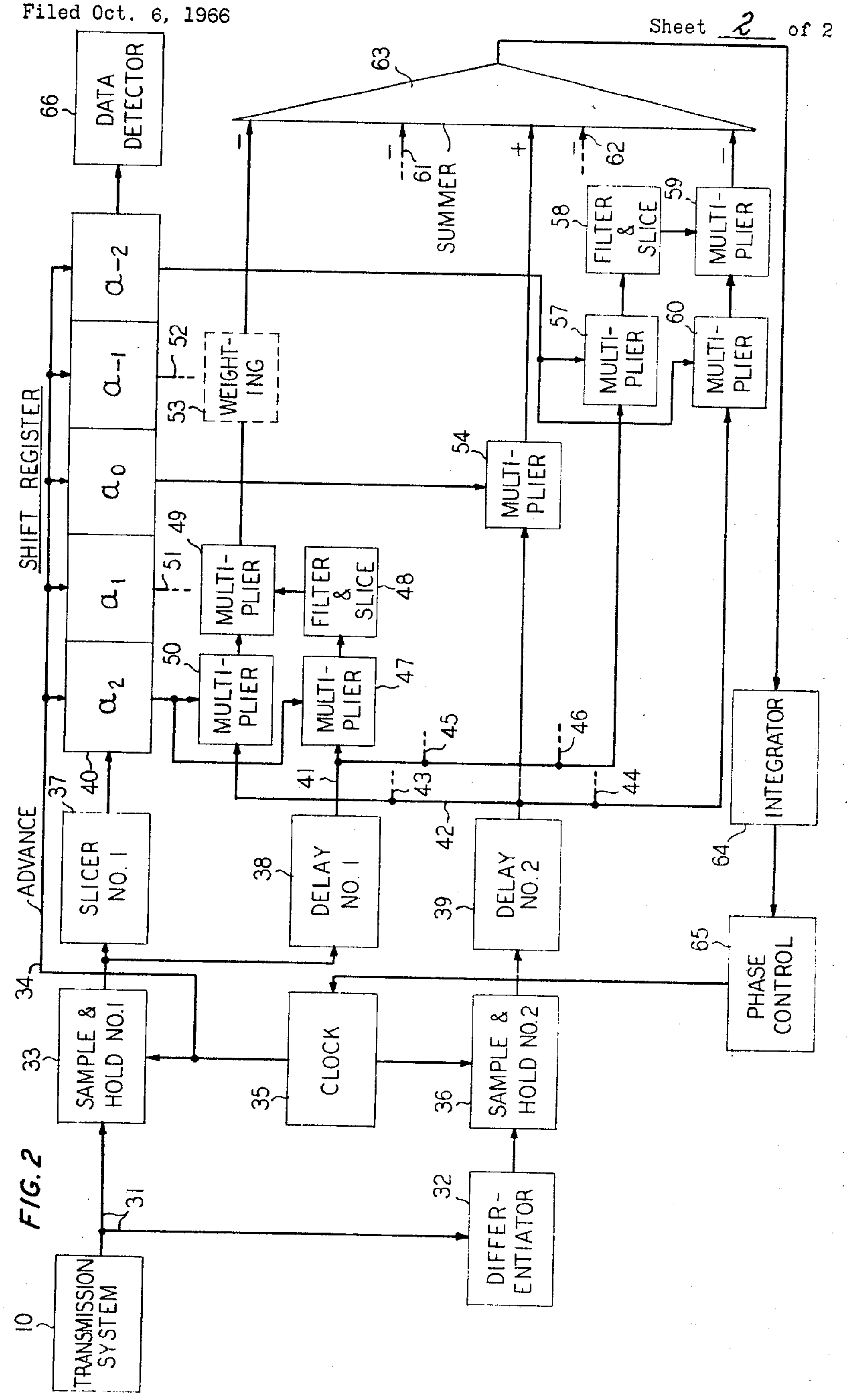

A fuller understanding and better appreciation of the objects, features and advantages of this invention will be obtained from a consideration of the following detailed description and the drawing in which:

FIG. 1 is a block diagram of an illustrative embodiment of a timing recovery system according to this invention which seeks the time of the peak of the received signal waveform; and FIG. 2 is a block diagram of an illustrative embodiment of the timing recovery system of this invention which seeks the time of the maximum opening of the eye pattern.

A digital data receiver requires timing information in order to interpret the received signal sequence properly. Each data symbol must be sampled at a time when its value has become fully established and when it is not in a condition of transition. The timing necessary to accomplish this may be termed symbol timing to cover the multilevel as well as the binary case. Symbol timing in the binary case is often called bit timing. Symbol timing is either conveyed by the data channel itself or by an auxiliary channel.

In a synchronous channel signal transitions from plus to minus and vice versa occur at integral multiples of the basic symbol interval. If the transitions occur often enough, the overall symbol timing can be established by monitoring the transitions. If an impulse is generated at each transition, the resulting frequency spectrum has a line at the symbol rate which is detectable in a resonant or a narrow bandpass circuit. Means are then provided for adjusting the phase of the timing signal thus established to provide the proper orientation with respect to the data signal. Usually a sufficient objective is to have either the positive or negative-going transitions of the timing wave coincide with the centers of the received symbol intervals.

Where symbol transitions are few and far between because of long trains of repeated like signals, for example, better results are obtained by having the transitions control the phase of a local oscillator or clock. An indication of the required correction is made possible by comparing the phase of the received transitions with that of the timing wave. Such a local clock arrangement is assumed in the disclosed embodiments of this invention.

The timing phase control technique of this invention is based on the data signal eye pattern characteristic. This pattern is produced on an oscilloscope when successive time intervals of a data signal train are superimposed one upon another in a manner known in the art. The type of display is known as an eye pattern because :he general shape of the center aperture or opening. : vertical dimension of the opening indicates the imum margin against noise when the wave is sam- l. The horizontal dimension indicates the range of ·ect sampling time and the amount of peak distortion to intersymbol interference. For multilevel signals lurality of eyes is obtained, each eye having the same ning.

n a standard m-level data transmission system the red baseband signal at the receiver is of the form $$s(t)=\sum_{n=-\infty}^{\infty} a_n f(t-nT) \qquad (1)$$

ere the information is carried in the $a_n$'s, which are iprobable positive or negative odd integers. The out- data is obtained by slicing at even integer levels : selecting the nearest level as the data symbol trans- ted. Equation 1 generally defines the eye pattern, ich need not actually be generated. The opening of eye pattern at any sampling instant can be represented $$D(t_0)=f(t_0)-(m-1)\sum_{n\neq 0}|f(t_0-nT)| \qquad (2)$$

ere $(m-1)$ is the maximum slicing level and T is the a interval. The term $f(t_0)$ is the desired symbol and second term is the intersymbol interference from ceding and following data symbols. The ideal sam- ıg instant occurs when Equation 2 is maximized.

The desired maximum will occur when the derivative Equation 2 equals zero. The partial derivative of uation 2 with respect to time $t_0$ is $$\frac{\partial D}{\partial t_0}=f'(t_0)-(m-1)\sum_{n\neq 0} f'(t_0-nT)sgn[f(t_0-nT)] \qquad (3)$$

ere *sgn* indicates the algebraic sign or polarity of the erference component.

The timing control system of this invention is based on evaluation of Equation 3. A signal proportional to uation 3 is integrated and used as an error control nal according to Equation 2 in a closed loop which justs the phase of a local clock oscillator.

We turn now to FIG. 1, which illustrates in block ıematic form a circuit for evaluating the first term Equation 3. An evaluation of this first term will pro- le an error control signal which will locate the peak the signal waveform. For binary systems and multi- ·el systems employing automatic equalization, choice the peak of the baseband received signal will be ade- ate to locate the sampling instant optimally.

In FIG. 1 transmission system 10 is any known binary multilevel data transmission system in which amplitude d phase distortion causes intersymbol interference. ansmission system 10 is assumed to include the usual ndpass filters and modulation and demodulation ap- ratus. The output of the system is a baseband signal. ıe impulse response of transmission system 10 is rep- sented by waveform 11.

The normal data receiver includes sample and hold ·cuit 14 controlled by timing clock 16, binary or multi- vel slicer 18 and data detector 20. Clock 16, running the nominal data transmission rate, provides sampling ılses near the center of each data interval. Sample and ıld circuit 14 includes a capacitor for storing the sam- ed amplitude of the received data symbol in a conven- ınal manner. Slicer 18 determines the most probable ıe polarity of the received symbol. Waveform 22 is pical of the output of slicer 18 although negative out- ıts are equiprobable. For multilevel signals this is the ost significant digit. Detector 20 determines the equiv- ent binary value of the received symbol.

According to this invention, additional apparatus are ovided to take the derivative of the received data wave ıd correlate simultaneous samples thereof with the detected data wave to form a control signal for clock 16. This additional apparatus comprises differentiator 13, sample and hold circuit 15, slicer 19, multiplier 21, integrator 24 and phase control 25. Differentiator 13 may advantageously include a series capacitor and shunt resistor having together a time constant short with respect to the data transmission rate. A representative output waveform 17 is depicted. Sample and hold circuit 15 and slicer 19 are identical to the similar circuits 14 and 18 in the main signal path. Waveform 23 is typical. Sample circuit 15 is controlled by a pulse from clock 16 synchronously with pulses applied to sample circuit 14. The output of slicer 19 will be positive or negative depending on the relation of the sampling instant to the zero-crossing intercept with waveform 17. Multiplier 21 may be of the switch type since both inputs are binary in nature. The output from multiplier 21 is positive or negative depending on the algebraic signs of the inputs thereto from slicers 18 and 19. Integrator 24 is a low-pass filter with a time constant long with respect to the data transmission rate and therefore its output is a slowly varying direct-current wave proportional to Equation 3. Phase control 25 may be an adjustable phase shift circuit controlling the phase of the outputs of clock 16, the frequency-determining element in a voltage controlled oscillator, or a reversible servo motor. Either of these is well known in the art. Phase control 25 may in the alternative constitute a function generator as disclosed in my copending joint application with L. N. Holzman (Case 3–6) Ser. No. 584,883, filed Oct. 10, 1966. The phase of the output of clock 16 is thus adjusted to coincide with the zero-crossing times of differentiated waveform 17. These zero-crossing times correspond with the peak amplitude of waveform 11. The sampling times of the output of clock 16 are thereby made to occur at more nearly optimum times than heretofore.

The timing recovery system of FIG. 1 can also be adapted to partial response systems of the type disclosed in the copending application of E. R. Kretzmer, Ser. No. 441,197, filed Mar. 19, 1965, now Patent No. 3,388,330. This is accomplished by adapting slicer 18 to slice on two levels so that waveform 22 may be either positive, negative or zero. The remainder of the circuit remains the same.

FIG. 2 is a block schematic diagram of a timing recovery system according to this invention which evaluates both terms of Equation 3 and therefore relates the sampling instant to the time of maximum eye opening. As in FIG. 1 the received wave on line 31 from a transmission system 10 is directly sampled in sample and hold circuit 33, differentiated in differentiator 32 and the derivative sampled in sample and hold circuit 36, both sample and hold circuits being operated simultaneously from a common clock circuit 35. In addition to correlating the present direct and derivative samples to form a control signal, derivative samples are further cross-correlated with neighboring past and succeeding samples of the direct wave. The contributions of the latter components are subtracted from the main component obtained as in FIG. 1 to form the control signal. Samples of the direct received wave are sliced in circuit 37 to obtain their polarities and stored in shift register 40, shown here with five storage cells for illustrative purposes. The length of the shift register is determined in a practical case by the effective range of the intersymbol interference. The contents of the shift register are conveniently shifted from left to right by advance pulses on lead 34 derived from clock 35. Center cell $a_0$ may be considered to store the present symbol polarity. Cells with negative subscripts store polarities of past symbols and cells with positive subscripts, succeeding polarities. Data detector 66 interprets the several levels in binary terms.

The output of sample and hold circuit 33 is applied to delay unit 38 and the output of sample and hold circuit 36, to delay unit 39. These two units are identical and provide the necessary delay to have their outputs coincide in time with the data sample stored in center stage $a_0$ of shift register 40. Delay units 38 and 39 may advantageously be additional shift register stages controlled by clock 35.

The present data polarity stored in cell $a_0$ is correlated with the delayed derivative sample from delay unit 39 in multiplier 54. This evaluates the first term of Equation 3. The output of delay unit 39 on lead 42 is applied also to additional multipliers, such as multiplier 50 having a further input from cell $a_2$ and multiplier 60 having a further input from cell $a_{-2}$, in order to correlate the derivative sample with neighboring data samples. Further multipliers (not shown) are associated with cells $a_1$ and $a_{-1}$ on leads 51 and 52 and with derivative sample leads 43 and 44 in a similar manner.

At the same time analog samples of the direct data wave delayed in unit 38 are correlated with neighboring sliced samples stored in shift register 40 as in multipliers 47 and 57. Multiplier 47 correlates sliced polarity $a_2$ with the present analog sample delayed. Similarly, other polarity samples are correlated in further multipliers (not shown), which are connected to leads 45 and 46. The outputs of these multipliers are integrated and sliced in filters 48, 58 and others not shown. A measure of the polarity of the intersymbol interference is thus obtained. The averaged outputs of filters 48 and 58 are then multiplied in multipliers 49 and 59, for example, by the corresponding derivative samples to form the summation components of the second term of Equation 3.

The output of direct multiplier 54 (first term of Equation 3) is combined with the outputs of interference component multipliers (second term of Equation 3), such as 49 and 59, in summation circuit 63. Other components are applied to summer 63 at leads 61 and 62. The polarity signs at the inputs of summer 63 indicate that the interference components are subtracted in accordance with Equation 3.

For multilevel symbols a weighting factor must be taken into account as indicated by block 53 at the output of multiplier 49. For binary signals the weighting factor $(m-1)$ is unity. For signals of more than two levels an appropriate multiplier must be provided. Weighting factors are required in the multilevel case for all negative inputs to summer 63.

The combination output of summer 63 is integrated in integrator 64 to form the phase control signal according to Equation 3 which operates on phase control 65 as in FIG. 1. Phase control 65 adjusts the phase of clock 35 accordingly. It can be shown by mathematical analysis that the output of integrator 64 is indeed proportional to Equation 3.

Although the present invention has been described in connection with particular embodiments thereof, it is to be understood that additional embodiments and modifications which will be apparent to those skilled in the art are included within the spirit and scope of the following claims.

What is claimed is:

1. A timing recovery circuit for synchronous digital data comprising means taking the time derivative of the received data train, means detecting the polarity of the symbols in the received data train, means correlating time-spaced simultaneous samples of the outputs of said taking and detecting means to form a product wave, means integrating said product wave to form a control wave, a clock source supplying simultaneous sampling pulses to said taking and detecting means, and phase control means responsive to said control wave causing said clock source to generate sampling pulses at instants of the optimum response of said dat[a] train.

2. The timing recovery circuit of claim 1 in which sai[d] detecting means comprises in combination sample and hold means controlled by a synchronou[s] sampling pulse from said clock and a zero-level slicer circuit producing standardized positive and negative outputs according to the polarit[y] of the sample of the received wave from said sampl[e] and hold means.

3. The timing recovery circuit of claim 1 in which sai[d] taking means includes a further sample and hold means controlled by a synchronous sampling pulse from said clock and a further zero-level slicer circuit producing standardized positive and negative outputs according to the polarity of the sample of the time derivative of a received wave from said further sample and hold means.

4. The timing recovery circuit of claim 1 in which said correlating means comprises a switching type modulator.

5. The timing recovery circuit of claim 1 in which a plurality of successive polarity samples of succeeding data symbols in said received data train from said detecting means are stored in a shift register, delayed samples of said received data train are correlated with preceding and succeeding polarity samples stored in said shift register to form first correlation products, said first correlation products are filtered and sliced, delayed samples of the time derivative of said received data train from said taking means are next correlated with preceding and succeeding polarity samples stored in said shift register to form second correlation products, said second correlation products are further correlated with filtered and sliced first correlation products to form third correlation products, and said third correlation products are subtracted from the product wave from said correlating means for simultaneous samples of the outputs from said taking and detecting means to form a control wave taking account of intersymbol interference.

6. The timing recovery system of claim 5 in which said received wave train has multilevel significance and said third correlation products are multiplied by a weighting factor proportional to one less than the total number of encoding levels.

7. In combination with a synchronous digital data transmission system, a timing recovery circuit comprising means differentiating the received signal wave train to form the time derivative thereof, a clock circuit providing synchronous sampling pulses, separate means controlled by simultaneous sampling pulses from said clock circuit sampling the direct received wave train and the time derivative from said differentiating means, separate zero-level slicing means for direct and derivative wave samples from said sampling means, multiplier means correlating the outputs of said slicing means to form correlation products proportional to the derivative of the peaks of the received wave train, integrating means averaging said correlation products to form a smooth control wave, and phase control means responsive to said control wave adjusting the phase of said clock circuit to bring said sampling pulses into coincidence with the peaks of said received wave train.

8. In combination with a synchronous digital data transmission system, a timing recovery circuit comprising means differentiating the received signal wave train to form the time derivative thereof, a clock circuit providing synchronous sampling pulses, separate means controlled by simultaneous pulses from said clock circuit sampling the direct received wave train and the time derivative thereof from said differentiating means, zero-level slicing means for direct wave samples from said sampling means indicating the polarities thereof, means storing indications of the polarity of successive samples of the direct wave from said slicing means, means delaying by identical amounts the direct and derivative samples from said sampling means, first multipling means correlating delayed direct samples with preceding and following polarity samples stored in said storing means to form first correlation products, second multipling means correlating delayed derivative samples with preceding and following polarity samples stored in said storing means to form second correlation products, main multipling means correlating a simultaneous derivative sample and a polarity sample to form a main correlation product, third multiplying means correlating said integrated and sliced second correlation products with corresponding first correlation products to form third correlation products proportional to interference components among succeeding wave train samples, combining means subtracting said third correlation products from said main correlation product to form a signal proportional to the derivative of the aperture of the received eye pattern, integrating means for the signal from said combining means to form a smooth control wave proportional to the derivative of the aperture of the received eye pattern, and phase control means responsive to said control wave adjusting the phase of said clock circuit to bring said sampling pulses into coincidence with the maximum aperture of the received eye pattern.

References Cited

UNITED STATES PATENTS 3,252,099 5/1966 Dodd -------------- 328—151

ARTHUR GAUSS, *Primary Examiner.*

J. D. FREW, *Assistant Examiner.*

U.S. Cl. X.R.

328—55, 63, 72, 155; 343—7.3